(12) United States Patent
Schneider

(10) Patent No.: US 8,078,613 B2
(45) Date of Patent: Dec. 13, 2011

(54) METHOD FOR REMOVING NETWORK EFFECTS FROM SEARCH ENGINE RESULTS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 511 days.

(21) Appl. No.: 11/998,329

(22) Filed: Nov. 28, 2007

(65) Prior Publication Data

US 2009/0138464 A1    May 28, 2009

(51) Int. Cl.
*G06F 7/00* (2006.01)
(52) U.S. Cl. ....................................... 707/726
(58) Field of Classification Search .................. 707/726
See application file for complete search history.

(56) References Cited

U.S. PATENT DOCUMENTS

| | | | |
|---|---|---|---|
| 6,285,999 B1* | 9/2001 | Page | 707/5 |
| 6,892,178 B1* | 5/2005 | Zacharia | 705/7.29 |
| 7,346,839 B2* | 3/2008 | Acharya et al. | 707/3 |
| 7,895,195 B2* | 2/2011 | Liu et al. | 707/723 |
| 2002/0129014 A1* | 9/2002 | Kim et al. | 707/5 |
| 2006/0004811 A1* | 1/2006 | McSherry | 707/101 |
| 2007/0088693 A1* | 4/2007 | Lawrence | 707/5 |
| 2007/0198603 A1* | 8/2007 | Tsioutsiouliklis et al. | 707/202 |
| 2008/0071766 A1* | 3/2008 | Grieselhuber et al. | 707/5 |
| 2008/0071797 A1* | 3/2008 | Thornton | 707/10 |

OTHER PUBLICATIONS

Helen Du and Christian Wagner, Weblog success: Exploring the role of technology, Int. J. Human-Computer Studies 64 (2006) 789-798 (available online Jun. 2006).*
Richard K Belew, Adaptive Information Retrieval: Using a connectionist representation to retrieve and learn about documents, Proceeding SIGIR '89 Proceedings of the 12th annual international ACM SIGIR conference on Research and development in information retrieval, pp. 11-20, 1989.*
Carlos Castillo, et al., Know your Neighbors: Web Spam Detection using the Web Topology, ACM SIGIR 2007, pp. 423-430, 2007.*

* cited by examiner

*Primary Examiner* — Christyann Pulliam
(74) *Attorney, Agent, or Firm* — Lowenstein Sandler PC

(57) ABSTRACT

A method and apparatus for ranking results from a search engine query is described. In one embodiment, the search engine provides results from a search query. The results contain a list of web pages where each web page has one or more inbound links. The search engine computes the growth of the number of inbound links of each web page over a predefined period of time. The search engine ranks each web page based on a function of its respective computed growth of the number of inbound links.

18 Claims, 5 Drawing Sheets

METHOD FOR REMOVING NETWORK EFFECTS FROM SEARCH ENGINE RESULTS

TECHNICAL FIELD

Embodiments of the present invention relate to a search engine, and more particularly, to search engine results.

BACKGROUND

Search engines that use link popularity to rank web sites tend to skew their results in favor of web sites that are more popular. Google™ uses an algorithm called PageRank™ that assigns a numerical weighting to each element of a hyperlinked set of documents to measure its relative importance within the set. PageRank™ results from voting among all other web pages about how important a web page is. A hyperlink to a page counts as a vote of support. Similarly, a web page that is linked to by many pages with high PageRank™ receives a high rank itself. If there are no links to a web page, there is no support for that web page.

However, such ranking computation using the absolute number of inbound links produces a networking effect in that popular pages tend to become more popular because search engines that base all or part of their ranking on popularity allow for more popular web pages to be easier to find. Easier to find web pages are more likely to be visited more often and more likely to have new inbound links added to them. As such, these networking effects tend to obscure relevance by swampling relevance signals in the noise.

DESCRIPTION OF THE DRAWINGS

The present invention is illustrated by way of example, and not by way of limitation, in the figures of the accompanying drawings and in which.

DETAILED DESCRIPTION

Described herein is a method and apparatus for ranking results from a search engine query is described. In one embodiment, the search engine provides results from a search query. The results contain a list of web pages where each web page has one or more inbound links. The search engine computes the growth of the number of inbound links of each web page over a predefined period of time. The search engine ranks each web page based on a function of its respective computed growth of the number of inbound links.

Figure 1:
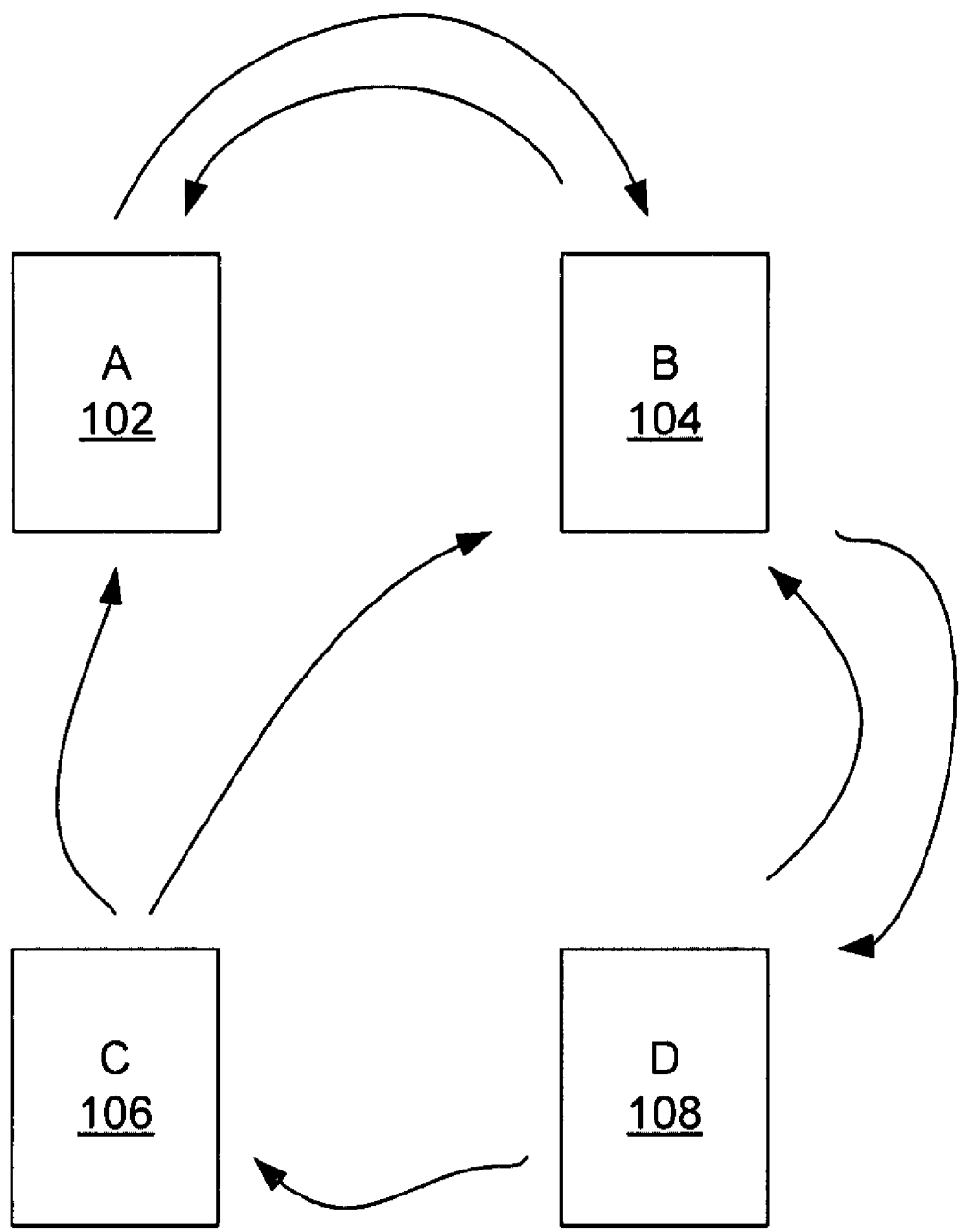
FIG. 1 is a block diagram illustrating a group of links between web pages.

FIG. 1 is a block diagram illustrating a group of links between web pages 102, 104, 106, and 108. The web pages include for example hyperlinked documents. Each web page may include one or more inbound links and/or one or more outbound links. For example, web page A 102 has one outbound link to web page B 104 and two inbound links from web pages B 104 and C 106. Web page B 104 has two outbound links to web page A 102 and web page D 108 and three inbound links to from web page A 102, web page C 106, and web page D 108. Web page D 108 has two outbound links to web page C 106 and one inbound link from web page B 104. Web page C 106 has two outbound links to web page A 102, web page B 104 and one inbound link from web page D 108. A search engine performing a search query based on the number of inbound links of each web page may rank web pages based on the absolute number of inbound links. As such, a popular web page may be popular because it has a high number of inbound links to it. Furthermore, a web page may also become popular because it has a number of inbound links from web pages that are deemed "important" or are highly rated. An example of a ranking of web pages from a search result of a search engine is illustrated in FIG. 2.

Figure 2:
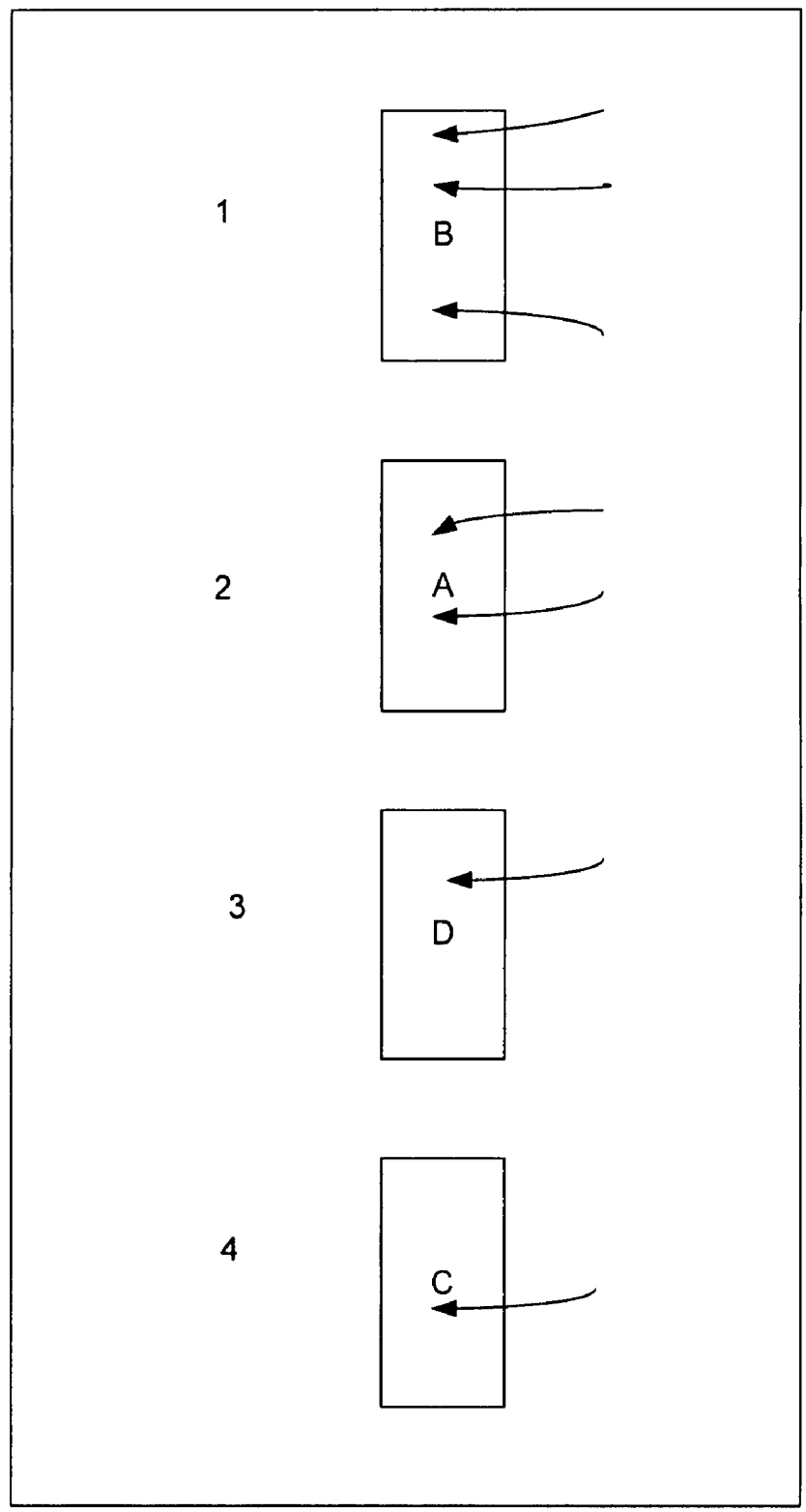
FIG. 2 is a block diagram illustrating a ranking of results from a search engine.

FIG. 2 is a block diagram illustrating a ranking of results from a search engine. Web page A has two inbound links. Web page B has three inbound links. Web page C has one inbound link. Web page D has one inbound link. Assuming the inbound links are from web pages with similar popularity, the search engine would rank the results in the following order: web page B, web page A, web page, D, and web page C using the absolute number of inbound links. However, such ranking computation using the absolute number of inbound links produces a networking effect. Popular pages become more popular because search engines that base all or part of their ranking on popularity guarantee that more popular pages are easier to find. Easier to find web pages are more likely to be visited more often and more likely to have new inbound links added to them. In accordance with one embodiment, one solution is to replace the count of links in absolute terms by a measure of inbound link growth as a function of time and existing links. A result of such computation is illustrated in FIG. 3.

Figure 3:
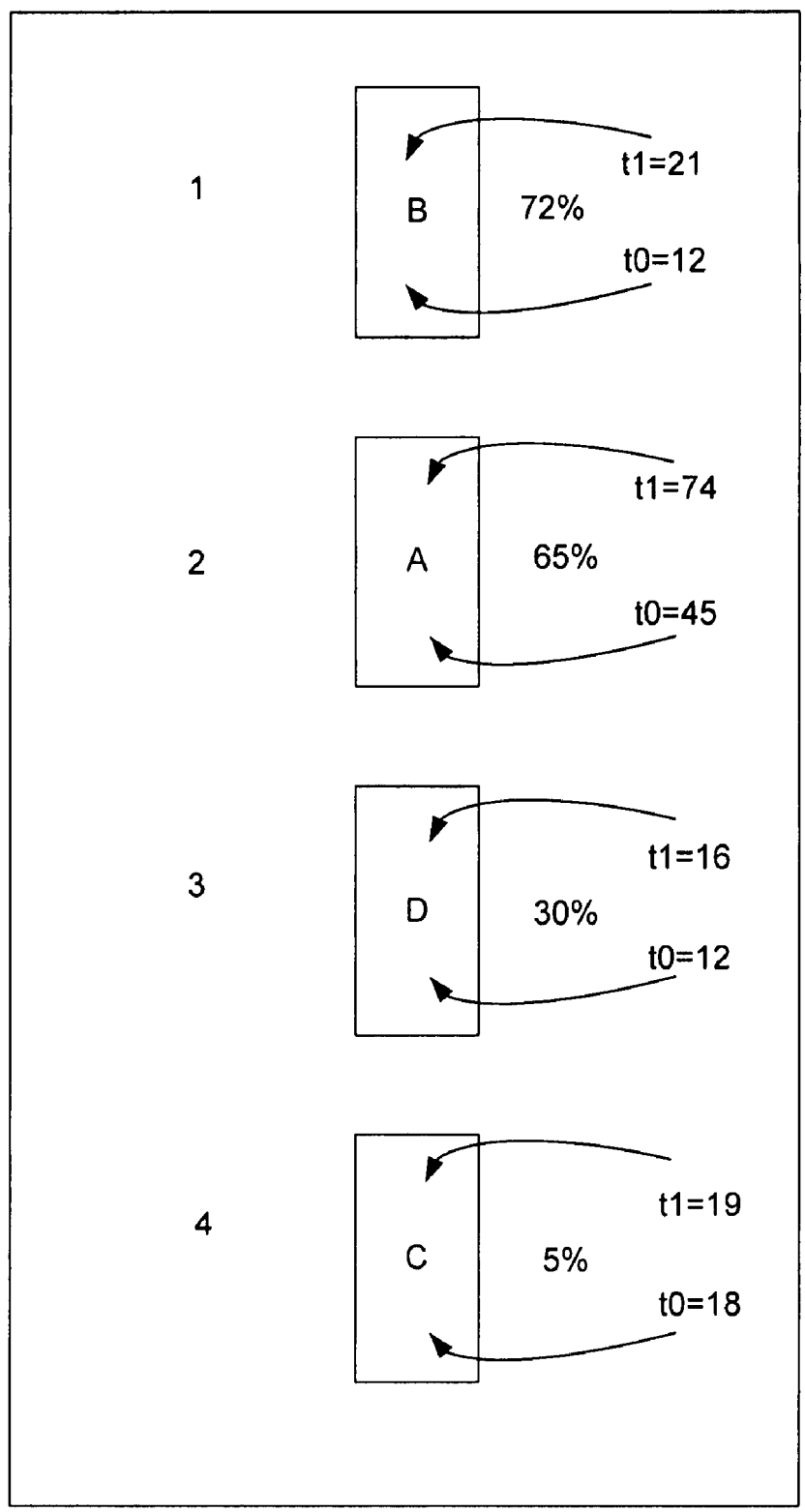
FIG. 3 is a block diagram illustrating one embodiment of a ranking of results from a search engine.

FIG. 3 is a block diagram illustrating one embodiment of a ranking of results from a search engine. In one embodiment, the growth of inbound links of a web page may be computed by dividing the number of new inbound links to the web page over a given interval by the number of existing links. The given interval may be a predetermined or arbitrary period of time that can be adjusted to improve accuracy of the ranking representation. The predetermined period of time may be defined between a first point in time (t0) and second point in time (t1). The first point in time (t0) may be any point in time in the past. The second point time (t1) may be another point in time after the first time up to the current time. For example, web page A may have 45 inbound links at t0 and 74 inbound links at t1. Web page A may have 45 inbound links at t0 and 74 inbound links at t1. Web page A may have 45 inbound links at t0 and 74 inbound links at t1. Web page A may have 45 inbound links at t0 and 74 inbound links at t1. Web page A may have 45 inbound links at t0 and 74 inbound links at t1.

For each web page, the number of inbound links at t0 is subtracted from the number of inbound links at t1. The difference is then divided by the number of inbound links at t1. As such, the growth percentage for web page A, B, C, and D is respectively 65%, 72%, 5%, and 30%. In the example illustrated in FIG. 3, a search engine may generate results ranked starting with web page B, A, D, and C since web page B has the highest growth of all web pages.

In accordance with another embodiment, to remove computation artifact involving a small sample of inbound links, a threshold or scale may be implemented where the growth of a web page with relatively small number of inbound links may be discounted or disregarded.

Figure 4:
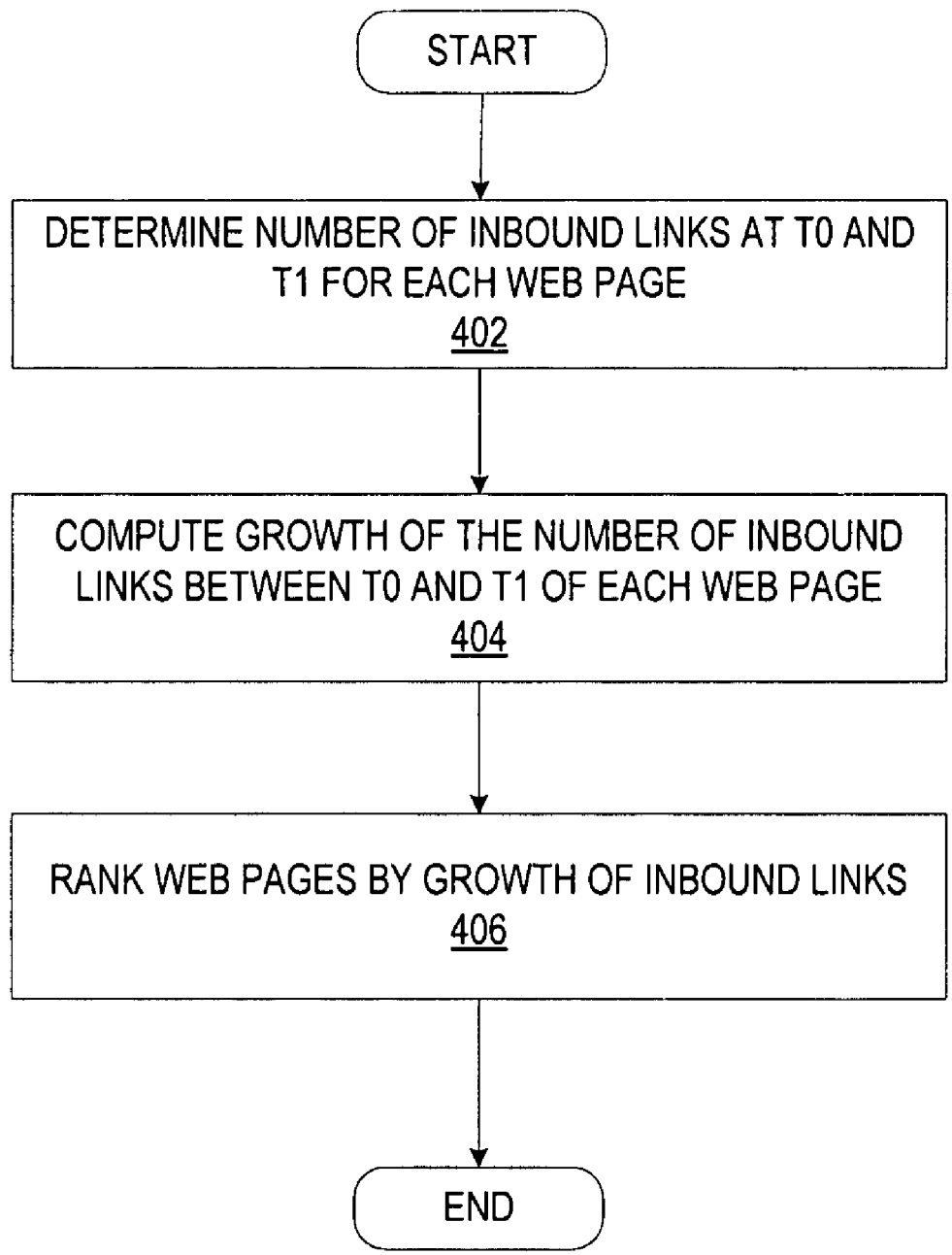
FIG. 4 is a block diagram illustrating one embodiment of an apparatus for ranking search results.

FIG. 4 is a flow diagram illustrating one embodiment of a method for ranking search results. First, the search engine generates results from a search query. The results include a list of web pages, or a list of links to web pages. Each web page can have one or more inbound links. At 402, the number of inbound links to a web page at a first time is determined along with the number of inbound links to the web page at a second time. The first time may be any point in time in the past. The second time may be another point in time after the first time up to the current time. At 404, the number of new inbound links is determined and used to compute a growth of the number of inbound links to each respective web page. In one embodiment, the growth may be computed by dividing the number of new inbound links to the web page by the number of current inbound links to the web page. At 406, the web pages from the results are then ranked accordingly based on their respective computed growth of the number of inbound links. In accordance with another embodiment, to counter the fluctuations of a relatively small sample of inbound links of a web page, a predetermined threshold may be implemented in the growth computation to adjust the growth of the number of inbound links to the web page. For example, a web site, having initially 5 inbound links and currently 10 inbound links, has grown by 100%. To remove this computation artifact, a threshold or scale may be implemented where the growth of web page with relatively small number of inbound links may be discounted or disregarded.

In one embodiment, the search engine ranks the results based on the growth of the number of inbound links of each web page from the highest growth to the lowest growth. In another embodiment, the search engine provides a link to the web page with the highest growth of the number of inbound links based on the ranking in response to the search query.

Figure 5:
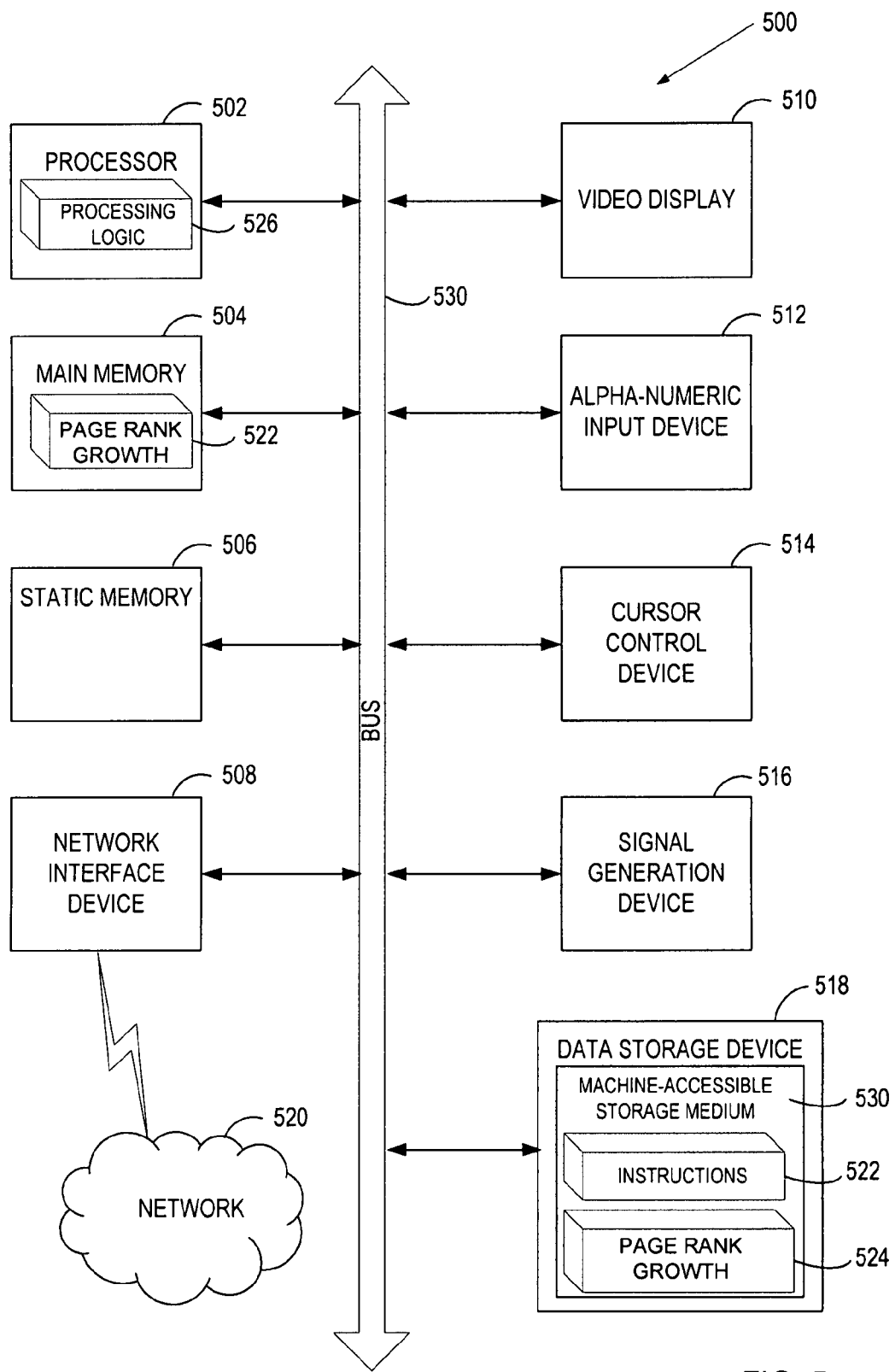
FIG. 5 is a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store a search engine module 524 for ranking web pages based on the growth computation as described above. The search engine module 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for ranking results from a search engine comprising:
   generating, by the search engine at a server, results from a search query, the results comprising a plurality of web pages, each web page having one or more inbound links;
   determining, by the search engine, an absolute number of inbound links to each web page in the results from the search query at a first point in time;
   identifying, by the search engine in the results from the search query, web pages having an absolute number of inbound links that is less than a predetermined threshold, wherein remaining web pages have an absolute number of inbound links that is not less than the predetermined threshold;
   computing, by the search engine, a growth of the number of inbound links of each web page in the results from the search query, wherein the computing excludes the identified web pages that have an absolute number of inbound links that is less than the predetermined threshold;
   ranking, by the search engine, each web page in the results from the search query that has an absolute number of inbound links above the predetermined threshold based on a function of its respective computed growth of the number of inbound links; and
   providing, by the search engine, a response to the search query using the ranking of web pages that depends on the growth of the number of inbound links of the web pages.

2. The method of claim 1 wherein computing the growth of the number of inbound links of a web page further comprises:
   determining the number of new inbound links to the web page over a predefined period of time; and
   dividing the number of new inbound links to the web page by the number of current inbound links to the web page.

3. The method of claim 2 wherein determining the number of new inbound links to the web page over the predefined period of time, the predefined period of time defined between the first point in time and a second point in time, further comprises:
   determining the number of inbound links to the web page at the second point in time;
   subtracting the number of inbound links to the web page at the first point in time from the number of inbound links to the web page at the first point in time.

4. The method of claim 3 further comprising:
   adjusting the growth of the number of inbound links to the web page based on the absolute number of inbound links to the web page at the first point in time with respect to the predetermined threshold.

5. The method of claim 1 wherein ranking further comprises:
   ranking the results based on the growth of the number of inbound links of each web page from the highest growth to the lowest growth.

6. The method of claim 1 further comprising:
   providing a link to the web page with the highest growth of the number of inbound links based on the ranking in response to the search query.

7. A non-transitory computer-readable storage medium including data that, when accessed by a computer system, cause the computer system to perform a method comprising:
   generating, by a search engine, results from a search query, the results comprising a plurality of web pages, each web page having one or more inbound links;
   determining, by the search engine, an absolute number of inbound links to each web page in the results from the search query at a first point in time;
   identifying, by the search engine, web pages having an absolute number of inbound links that is less than a predetermined threshold in the results from the search query, wherein remaining web pages have an absolute number of inbound links that is not less than the predetermined threshold;
   computing, by the search engine, a growth of the number of inbound links of each web page in the results from the search query, wherein the computing excludes the identified web pages that have an absolute number of inbound links that is less than the predetermined threshold;
   ranking, by the search engine, each web page in the results from the search query that has an absolute number of inbound links above the predetermined threshold based on a function of its respective computed growth of the number of inbound links; and
   providing, by the search engine, a response to the search query using the ranking of web pages that depends on the growth of the number of inbound links of the web pages.

8. The non-transitory computer-readable storage medium of claim 7 wherein computing the growth of the number of inbound links of a web page further comprises:

determining the number of new inbound links to the web page over a predefined period of time; and dividing the number of new inbound links to the web page by the number of current inbound links to the web page.

9. The non-transitory computer-readable storage medium of claim 8 wherein determining the number of new inbound links to the web page over the predefined period of time, the predefined period of time defined between the first point in time and a second point in time, further comprises:

determining the number of inbound links to the web page at the second point in time;

subtracting the number of inbound links to the web page at the first point in time from the number of inbound links to the web page at the first point in time.

10. The non-transitory computer-readable storage medium of claim 9 wherein the method further comprises:

adjusting the growth of the number of inbound links to the web page based on the absolute number of inbound links to the web page at the first point in time with respect to the predetermined threshold.

11. The non-transitory computer-readable storage medium of claim 7 wherein ranking further comprises:

ranking the results based on the growth of the number of inbound links of each web page from the highest growth to the lowest growth.

12. The non-transitory computer-readable storage medium of claim 7 wherein the method further comprises:

providing a link to the web page with the highest growth of the number of inbound links based on the ranking in response to the search query.

13. A computing system comprising:

a storage device configured to store a computed growth of the number of inbound links of a web page; and a processing device coupled to the storage device, the processing device comprising a search engine module, the search engine configured to generate from a search query, the results comprising a plurality of web pages, each web page having one or more inbound links, to determine an absolute number of inbound links to each web page in the results from the search query at a first point in time, to identify web pages having an absolute number of inbound links that is less than a predetermined threshold in the results from the search query, wherein remaining web pages have an absolute number of inbound links that is not less than the predetermined threshold, to compute the growth of the number of inbound links of each web page in the results from the search query, wherein the computing excludes the identified web pages that have an absolute number of inbound links that is less than the predetermined threshold, to rank each web page having an absolute number of inbound links above the predetermined threshold in the results from the search query based on a function of its respective computed growth of the number of inbound links, and to provide a response to the search query using the ranking of web pages that depends on the growth of the number of inbound links of the web pages.

14. The computing system of claim 13 wherein the search engine module is configured determine the number of new inbound links to the web page over a predefined period of time, and divide the number of new inbound links to the web page by the number of current inbound links to the web page.

15. The computing system of claim 14 wherein the search engine module is configured to determine the number of inbound links to the web page at a second point in time, and to subtract the number of inbound links to the web page at the first point in time from the number of inbound links to the web page at the first point in time, the predefined period of time defined between a first point in time and a second point in time.

16. The computing system of claim 15 wherein the search engine module is configured to adjust the growth of the number of inbound links to the web page based on the absolute number of inbound links to the web page at the first point in time with respect to the predetermined threshold.

17. The computing system of claim 13 wherein the search engine module is configured to rank the results based on the growth of the number of inbound links of each web page from the highest growth to the lowest growth.

18. The computing system of claim 13 wherein the search engine module is configured to further provide a link to the web page with the highest growth of the number of inbound links based on the ranking in response to the search query.

* * * * *